United States Patent
Washino et al.

(10) Patent No.: US 7,525,270 B2
(45) Date of Patent: Apr. 28, 2009

(54) MOTOR CONTROL APPARATUS

(75) Inventors: Seiichiro Washino, Kariya (JP); Masaru Kamiya, Toyoake (JP); Koji Sakai, Kariya (JP); Junichi Semura, Kariya (JP)

(73) Assignee: DENSO CORPORATION, Kariya (JP)

( * ) Notice: Subject to any disclaimer, the term of this patent is extended or adjusted under 35 U.S.C. 154(b) by 46 days.

(21) Appl. No.: 11/472,327

(22) Filed: Jun. 22, 2006

(65) Prior Publication Data
US 2006/0290305 A1    Dec. 28, 2006

(30) Foreign Application Priority Data
Jun. 27, 2005 (JP) ............... 2005-187010
Apr. 21, 2006 (JP) ............... 2006-118529

(51) Int. Cl.
*H02P 7/00* (2006.01)
(52) U.S. Cl. ............ 318/432; 318/433; 318/434
(58) Field of Classification Search ............ None
See application file for complete search history.

(56) References Cited

U.S. PATENT DOCUMENTS 5,708,334 A * 1/1998 Schreiber et al. ......... 318/432
6,404,152 B1   6/2002 Kobayashi et al.
6,414,455 B1 * 7/2002 Watson ................. 318/432
6,859,001 B2 * 2/2005 Kane et al. ............ 318/400.23

FOREIGN PATENT DOCUMENTS
JP    A-11-275885    10/1999
JP    A-2004-019461    1/2004

OTHER PUBLICATIONS

Office Action dated Feb. 15, 2008 in corresponding Chinese Patent Application No. 200610094203.7 (and English translation).

* cited by examiner

*Primary Examiner*—Walter Benson
*Assistant Examiner*—Renata McCloud
(74) *Attorney, Agent, or Firm*—Posz Law Group, PLC

(57) ABSTRACT

A motor control apparatus for controlling a motor with reduced noise and vibration includes a detecting means for detecting a rotational speed of the motor, a command signal processing means that generates a command signal for allowing the motor to rotate at a predetermined rotational speed, a drive means that generates a drive signal based on the command signal and supplies the drive signal to the motor, and a control signal generation means that generates a control signal for allowing the motor to produce a control torque having a frequency equal to one of frequencies of noise and vibration due to the motor. The frequency of the control torque corresponds to at least one of orders of the rotational speed detected by the detecting means. The command signal processing means generates the command signal based on the control signal.

17 Claims, 8 Drawing Sheets

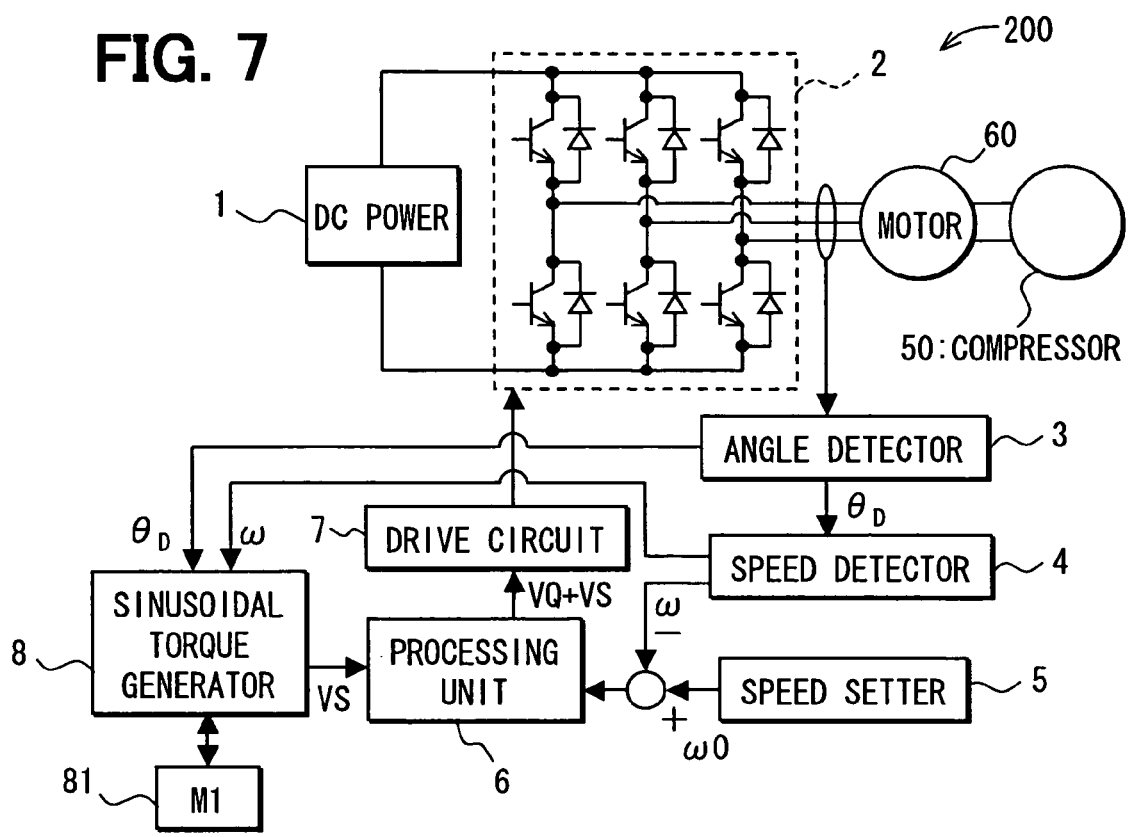
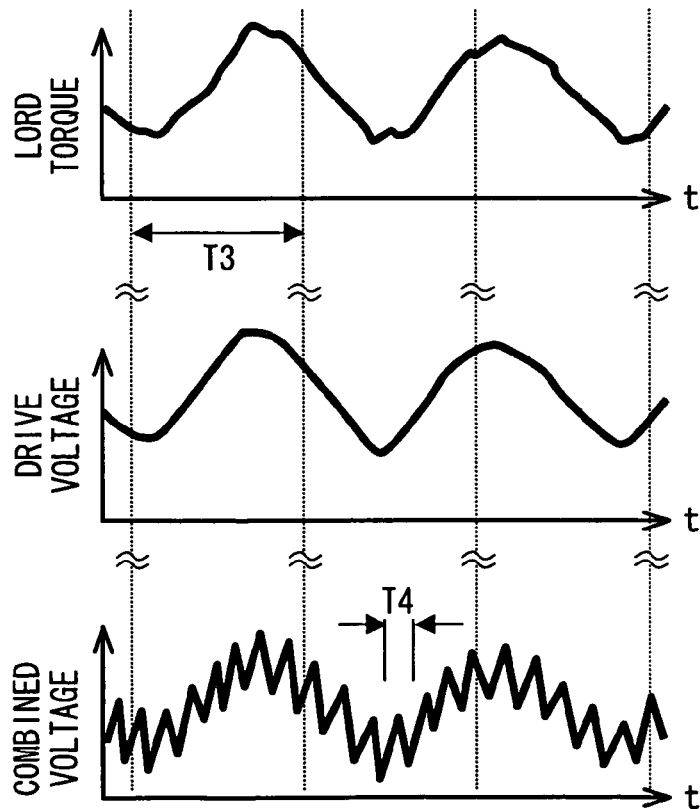

| M2 → | | |
|---|---|---|
| $F_N$ | $KF_N$ | $\theta F_N$ |
| F1 | KF1 | $\theta$ F1 |
| F2 | KF2 | $\theta$ F2 |

| M3 → | | |
|---|---|---|
| $P_N$ [MPa] | $KP_N$ | $\theta P_N$ |
| P1 | KP1 | $\theta$ P1 |
| : | : | : |

MOTOR CONTROL APPARATUS

CROSS REFERENCE TO RELATED APPLICATION

This application is based on and incorporates herein by reference Japanese Patent Applications No. 2005-187010 filed on Jun. 27, 2005 and No. 2006-118529 filed on Apr. 21, 2006.

FIELD OF THE INVENTION

The present invention relates to a motor control device for controlling a motor with reduced noise and vibration.

BACKGROUND OF THE INVENTION

A motor control apparatus for driving a brushless (direct current) DC motor are disclosed in JP-A-H11-275885 and JP-A-2004-19461. The motor control apparatus include an inverter circuit for switching a drive current provided to armature windings of the motor at a predetermined timing so that the motor can rotate. The motor control apparatus reduces noise and vibration generated from the motor.

In the motor control apparatus disclosed in JP-A-H11-275885, a rotational speed range of the motor is divided into multiple speed regions and multiple switching timings corresponding to each speed region are prestored in a memory device. For example, when the motor is driven in a first speed region, a first switching timing corresponding to the first speed region is read from the memory device and the inverter circuit switches the drive current at the first switching timing. The switching timings are set to reduce vibration of the motor, the motor assembly, or a structure around the motor as much as possible. The vibration is due to torque ripple caused by switching the drive current. In each speed region of the rotational speed range, thus, the noise and vibration due to the torque ripple are reduced.

In the motor control apparatus disclosed in JP-A-2004-19461, an average voltage corresponding to the rotational speed of the motor is multiplied by a control value corresponding to a rotational angle (load torque) of the motor. In such an approach, a drive torque generated at each rotational angle can track the load torque to reduce vibration due to a difference between the drive torque and the load torque.

It is known that when resonance frequencies of the motor, the motor assembly, or the structure around the motor are equal to orders, i.e., harmonics of the rotational speed of the motor, the order components may cause the noise and vibration.

The motor control apparatus disclosed in JP-A-H11-275885 is for reducing the noise and vibration due to the torque ripple and the motor control apparatus disclosed in JP-A-2004-19461 is for reducing the noise and vibration due to the difference between the drive torque and the load torque. In the motor control apparatus disclosed in JP-A-H11-275885 and JP-A-2004-19461, therefore, it is difficult to reduce the noise and vibration due to the orders of the rotational speed of the motor.

SUMMARY OF THE INVENTION

In view of the above-described problem, it is an object of the present invention to provide a motor control apparatus for contorting a motor to reduce noise and vibration due to orders of a rotational speed of the motor.

A motor control apparatus includes a detecting means for detecting a rotational speed of the motor, a command signal processing means that generates a command signal for allowing the motor to rotate at a predetermined rotational speed, a drive means that generates a drive signal based on the command signal and supplies the drive signal to the motor, a control signal generation means that generates a control signal for allowing the motor to produce a control torque having a frequency equal to one of frequencies of the noise and vibration and outputs the control signal to the command signal processing means. The frequency of the control torque corresponds to at least one of orders of the rotational speed detected by the detecting means. The control signal is sinusoidal.

The command signal processing means generates the command signal based on the control signal and outputs the command signal to the drive means. Thus, the drive means can generate the drive signal that is capable of driving the motor to reduce the noise and vibration due to the orders of the rotational speed of the motor.

BRIEF DESCRIPTION OF THE DRAWINGS

The above and other objectives, features and advantages of the present invention will become more apparent from the following detailed description made with reference to the accompanying drawings. In the drawings:

FIG. 7 is a block diagram of a motor control apparatus according to a second embodiment of the present invention;

FIG. 8A is a graph showing a load torque for a compressor of FIG. 7, FIG. 8B is a graph showing a drive voltage supplied to a motor of FIG. 7, and FIG. 8C is a graph showing a combined voltage of the drive voltage and a sinusoidal voltage supplied to the motor of FIG. 7;

DETAILED DESCRIPTION OF THE PREFERRED EMBODIMENTS

First Embodiment

A motor control apparatus 100 according to the first embodiment of the present invention will now be described with reference to FIGS. 1 to 6.

The motor control apparatus 100 is used to control a motor 60 that drives a compressor 50. The compressor 50 is a component of a vehicular air conditioner unit that uses a refrigeration cycle. In the refrigeration cycle, the compressor 50 pumps refrigerant from an evaporator (not shown), compresses the refrigerant to high temperature and pressure, and supplies the compressed refrigerant to a condenser (not shown). For example, the compressor 50 is mounted to an engine block as a mounting structure in an engine room of a vehicle.

The motor 60 is a three-phase (phases A-C) brushless direct current (DC) motor and has stator coils corresponding to each of the phases A-C. A voltage is applied to the stator coils at respective timings so that the motor 60 can rotate.

Figure 1:
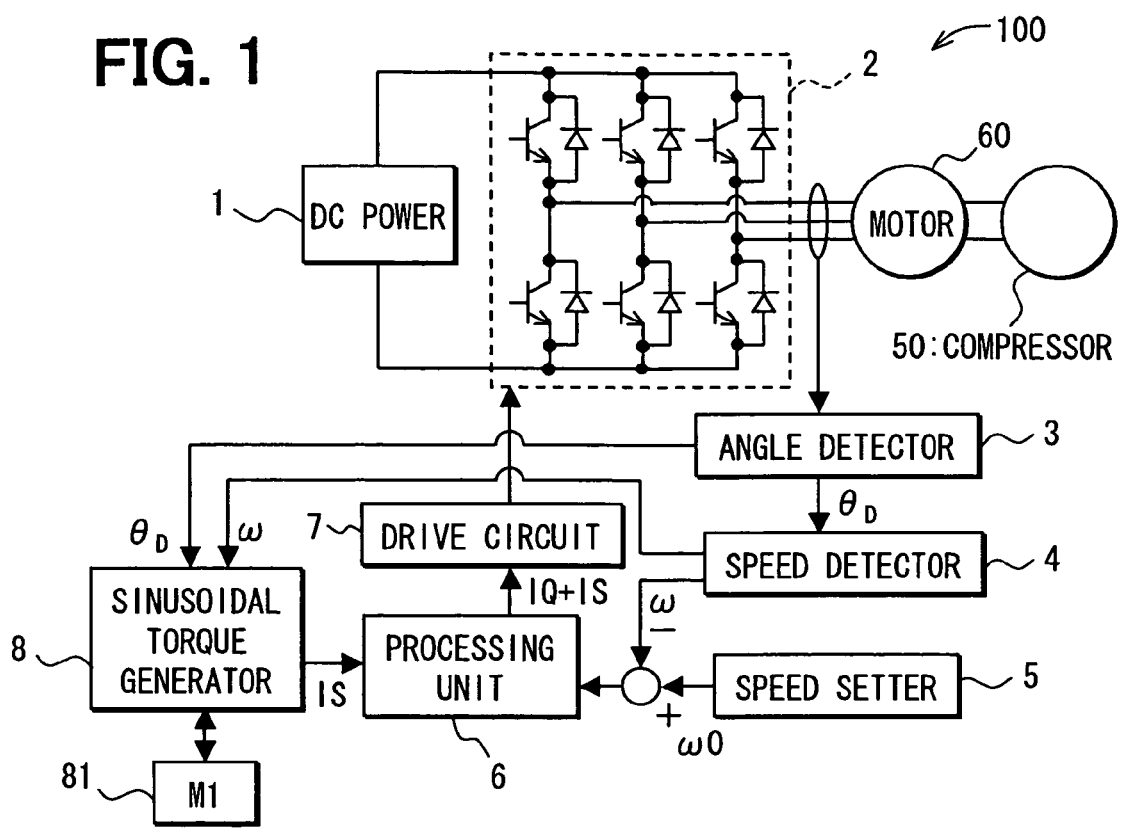
FIG. 1 is a block diagram of a motor control apparatus according to a first embodiment of the present invention.

As shown in FIG. 1, the motor control apparatus 100 includes a DC power source 1, an inverter circuit 2, a rotational angle detector 3, a rotational speed detector 4, a desired speed setter 5, a processing unit 6, a drive circuit 7, and a sinusoidal torque generator 8.

The DC power source 1 is supplied with alternating current (AC) power from an AC power source (not shown), converts the AC power to DC power, and supplies the DC power to the inverter circuit 2. The inverter circuit 2 includes switching elements corresponding to the respective phases A-C and the switching elements switches based on a PWM voltage signal that is output from the drive circuit 7 at the respective timings. Thus, the inverter circuit 2 converts the DC power, which is single-phase power, to three-phase power and supplies the three-phase power to the motor 60.

The rotational angle detector 3 measures at least one of the three phase currents output from the inverter circuit 2, estimates a rotational angle $\theta_D$ of the motor 60 based on the measured current and a predetermined estimation algorithm, and outputs the rotational angle $\theta_D$ to the rotational speed detector 4.

The rotational speed detector 4 detects a rotational speed $\omega$ of the motor 60 based on the rotational angle $\theta_D$. The desired speed setter 5 sets a desired rotational speed $\omega 0$ of the motor 60. A deviation signal between the rotational speed $\omega$ and the desired rotational speed $\omega 0$ is input to the processing unit 6.

The processing unit 6 generates a q-axis current signal IQ based on the deviation signal. The q-axis current signal IQ is a basic signal for driving the motor 60. The processing unit 6 combines the q-axis current signal IQ with a sinusoidal current signal IS output from the sinusoidal torque generator 8, thereby generating a combined current signal IQ+IS. The combined current signal IQ+IS is output from the processing unit 6 to the drive circuit 7. The drive circuit 7 generates the PWM signal based on the combined current signal IQ+IS and outputs the PWM signal to the inverter circuit 2.

The sinusoidal torque generator 8 includes a memory 81 having a map Ml and, reads data corresponding to the rotational speed $\omega$, which is detected by the rotational speed detector 4, from the map Ml. Then, the sinusoidal torque generator 8 generates the sinusoidal current signal IS based on the data and outputs the sinusoidal current signal IS to the processing unit 6. The sinusoidal current signal IS allows the motor 60 to produce a sinusoidal torque $T_S$ represented by the following equation;

$$T_S = K_N \cdot \sin(N \cdot \theta_D - \theta N) \tag{1}$$

In the equation (1), N indicates a rotational order, i.e., a harmonic of the rotational speed $\omega$ of the motor 60, $K_N$ indicates an amplitude corresponding to the order N, and $\theta_N$ indicates a phase angle corresponding to the order N.

The 1st order (N=1) refers to the rotational speed $\omega$ of the motor 60. Each order thereafter is a corresponding multiple of the rotational speed $\omega$. The 2nd order (N=2) is twice the rotational speed $\omega$, the 3rd order (N=3) is three times the rotational speed $\omega$, and so on. For example, when the motor 60 rotates at the rotational speed $\omega$ a of 4000 revolutions per minute (rpm), i.e., 4000/60 revolutions per second (rps), the 3rd order occurs at a frequency of 200 Hz.

Figure 2:
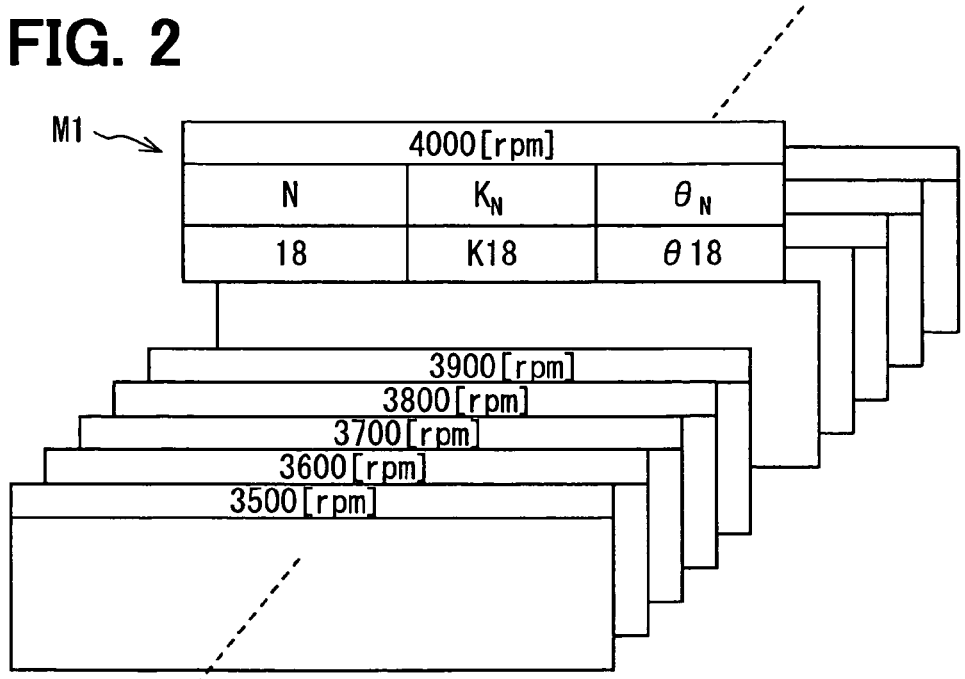
FIG. 2 is a schematic view of a map included in the motor control apparatus of FIG. 1.

As shown in FIG. 2, the map M1 includes a set of tables, each of which corresponds to each rotational speed $\omega$ of the motor 60. Each table has three columns and at least one row. In each table, a first column contains the order N, a second column contains the amplitude $K_N$, and a third column contains a phase angle $\theta_N$. When the sinusoidal torque $T_s$ has the amplitude $K_N$ and the phase angle $\theta_N$, the noise and vibration of the motor 60 is efficiently reduced.

The amplitude $K_N$ and the phase angle $\theta_N$ are determined in an experiment where the motor 60 is mounted on the vehicle and operated in practical conditions.

Figure 3:
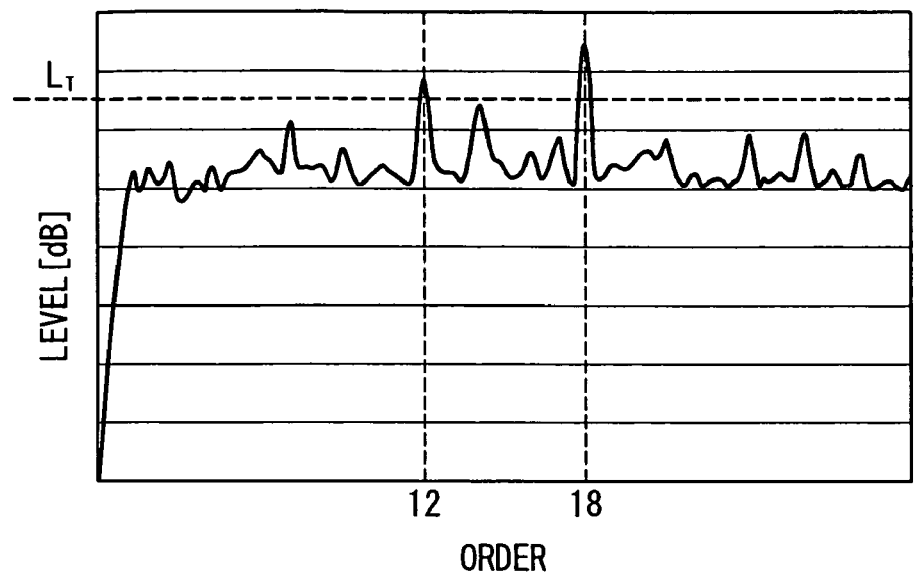
FIG. 3 is a graph illustrating a sound pressure level observed when a motor is driven.

FIG. 3 shows a result of the experiment where the motor 60 rotates at the rotational speed $\omega$ of 4000 rpm. As can be seen from FIG. 3, the sound pressure level exceeds a predetermined threshold level $L_T$ and is peaked at the 18th order, i.e., a frequency of 1200 Hz. In the table corresponding to the rotational speed $\omega$ of 4000 rpm, therefore, an amplitude $K_{18}$ and a phase angle $\theta_{18}$ corresponding to the 18th order are set. Values of the amplitude $K_{18}$ and the phase angle $\theta_{18}$ are determined such that the peaked sound pressure level can be reduced as much as possible.

Thus, the noise and vibration of the motor 60 can be efficiently reduced. Alternatively, because the sound pressure level also exceeds the predetermined threshold level $L_T$ at the 12th order, i.e., a frequency of 800 Hz, the table may have two rows one of which corresponds to the 12th order and the other of which corresponds to the 18th order. In such an approach, the noise and vibration of the motor 60 can be more efficiently reduced.

In each rotational speed $\omega$ of the motor 60, the order N at which the sound pressure level exceeds the predetermined threshold level $L_T$ or is peaked is measured. Then, the amplitude $K_N$ and the phase angle $\theta_N$ corresponding to the order N are set in each table corresponding to each rotational speed $\omega$. Thus, each table is completed so that the map M1 can be completed. The map M1 is stored in the memory 81. Alternatively, the order N that is set in each table of the map M1 may correspond to a resonant frequency of the engine block to which the compressor 50 is mounted, the motor 60, or the refrigerant that circulates through the refrigeration cycle.

In this case, when the sinusoidal current signal IS has an amplitude larger than that of the q-axis current signal IQ, the motor 60 cannot rotate. In other words, when the amplitude $K_N$ of the sinusoidal torque $T_S$ generated by the sinusoidal current signal IS is larger than that of a driving torque generated by the q-axis current signal IQ, the motor 60 cannot rotate. Therefore, the amplitude $K_N$ is set in the map M1 within a range where the amplitude of the driving torque is larger than that of the sinusoidal torque $T_S$.

Figure 4A:
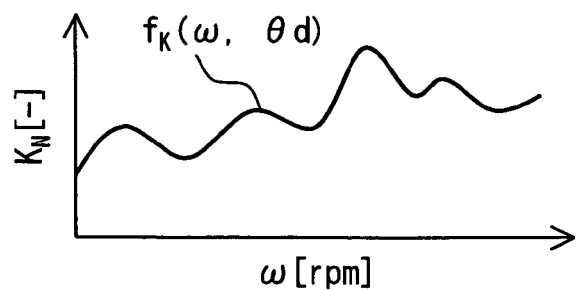
FIG. 4A is a graph illustrating a relation between an amplitude and a rotational speed.
Figure 4B:
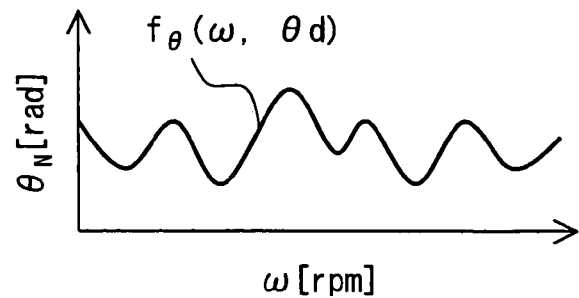
FIG. 4B is a graph illustrating a relation between a phase angle and the rotational speed.

Instead of using the map M1, each of the amplitude $K_N$ and the phase angle $\theta_N$ may be calculated as a function of the rotational speed $\omega$, the rotational angle $\theta_D$ of the motor 60, or physical quantity such as discharge pressure $P_N$ described later in a fifth embodiment. As shown in FIG. 4A, a first function $f_K(\omega,\theta_D)$ gives the amplitude $K_N$. The first function $f_K(\omega,\theta_D)$ can be obtained with non-linear interpolation between each amplitude $K_N$ determined in the experiment. Likewise, as shown in FIG. 4B, a second function $f_\theta(\omega,\theta_D)$ gives the phase angle $\theta_N$. The second function $f_\theta(\omega,\theta_D)$ can be obtained with non-linear interpolation between each phase angle $\theta_N$ determined in the experiment. In such an approach, the memory 81 has no need to store the map M1 so that required storage capacity for the memory 81 can be reduced.

Operations of the motor control apparatus 100 will now be described. The motor control apparatus 100 starts the motor 60 and controls the motor 60 such that the motor 60 rotates at the desired rotational speed $\omega 0$. Specifically, the sinusoidal torque generator 8 receives the rotational speed $\omega$ of the motor 60 from the rotational speed detector 4. Then, the sinusoidal torque generator 8 reads the amplitude $K_N$ and the phase angle $\theta_N$ corresponding to the order N from the table that is included in the map M1 of the memory 81 and corresponds to the rotational speed $\omega$. Based on the amplitude $K_N$ and the phase angle $\theta_N$, the sinusoidal torque generator 8 generates the sinusoidal current signal IS for allowing the motor 60 to produce the sinusoidal torque $T_S$ represented by the equation (1). The sinusoidal current signal IS is output to the processing unit 6.

The processing unit 6 generates the q-axis current signal IQ for allowing the motor 60 to produce the driving torque that follows the ripple in the load torque required to drive the compressor 50. Then, in the processing unit 6, the q-axis current signal IQ and the sinusoidal current signal IS are combined into the combined current signal IQ+IS. The combined current signal IQ+IS is output to the drive circuit 6.

Figure 5A:
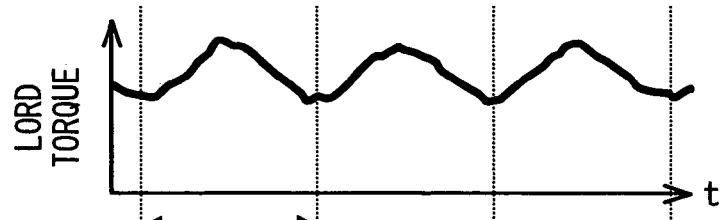
FIG. 5A is a graph showing a load torque for a compressor of FIG. 1.
Figure 5B:
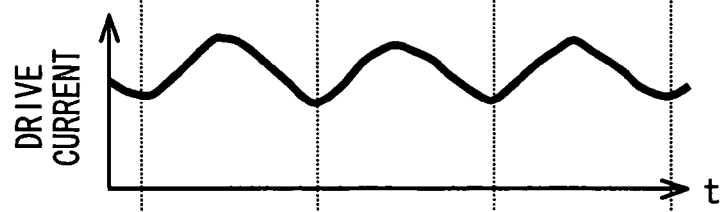
FIG. 5B is a graph showing a drive current supplied to a motor of FIG. 1.
Figure 5C:
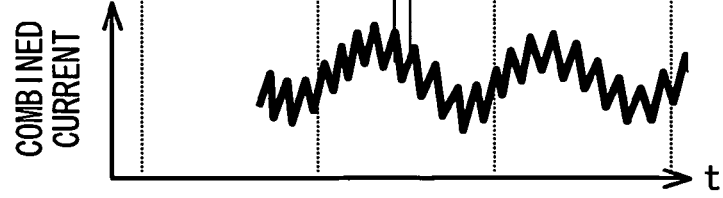
FIG. 5C is a graph showing a combined current of the drive current and a sinusoidal current supplied to the motor of FIG. 1.

Because the load torque changes in a period of T1 as shown in FIG. 5A, the rotational speed $\omega$ of the motor 60 changes accordingly. The q-axis current signal IQ generated by the processing unit 6 allows the motor 60 to be supplied with a driving current corresponding to the driving torque. As shown in FIG. 5B, the driving current changes such that the driving torque of the motor 60 follows the change in the load torque. Thus, the change in the rotational speed $\omega$ of the motor 60 can be reduced. The sinusoidal current signal IS allows the motor 60 to be supplied with a sinusoidal current that corresponds to the sinusoidal torque $T_S$ and changes in a period of T2. Therefore, the combined current signal IQ+IS allows the motor 60 to be supplied with a combined current shown in FIG. 5C.

Figure 6:
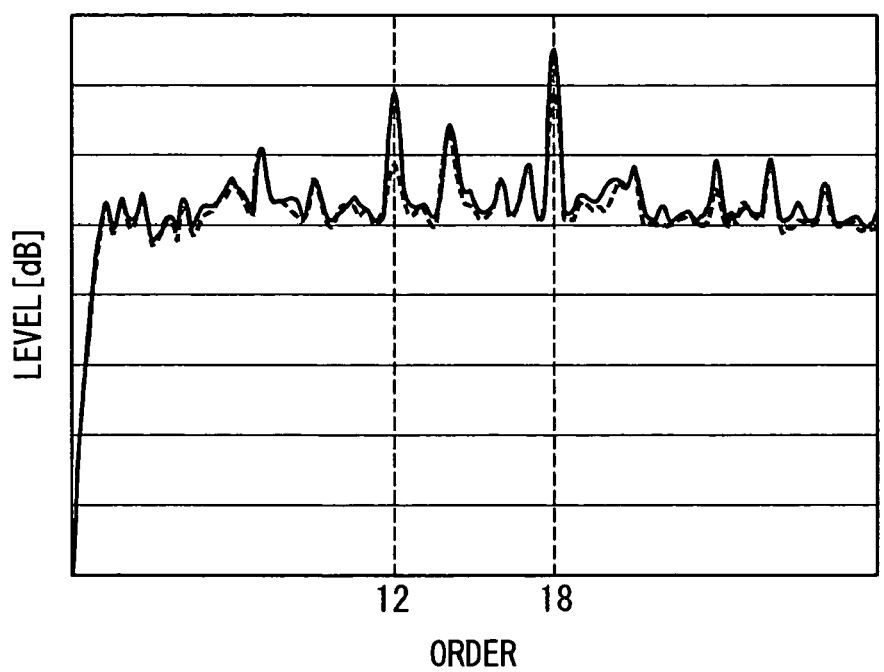
FIG. 6 is a graph illustrating a sound pressure level observed when the motor control apparatus of FIG. 1 drives the motor.

FIG. 6 is a graph showing a sound pressure level observed when the motor 60 rotates at the rotational speed $\omega$ of 4000 rpm. In FIG. 6, a dashed line indicates a first case where the motor 60 is supplied with no sinusoidal current and a solid line indicate a second case where the motor 60 is supplied with the sinusoidal current having frequency components of 800Hz and 1200Hz. As can be seen from the graph, the sound pressure level is reduced at the 12th and 18th orders, i.e., at the frequencies of 800Hz and 1200Hz. In this case, the sinusoidal current having frequency components of 800Hz and 1200Hz can be created based on a combined signal of the sinusoidal current signal IS corresponding to the 12th order and the sinusoidal current signal IS corresponding to the 18th order.

Thus, the noise and vibration due to the order N can be reduced by supplying the sinusoidal current that has a frequency, an amplitude, and a phase angle corresponding to the order N.

Second Embodiment

A motor control apparatus 200 according to the second embodiment of the present invention will now be described with reference to FIG. 7 and FIG. 8.

In the motor control apparatus 200, a processing unit 6 generates a q-axis voltage signal VQ for allowing the motor 60 to produce the driving torque that follows the ripple in the load torque required to drive the compressor 50. A sinusoidal torque generator 8 receives the rotational speed $\omega$ of the motor 60 from the rotational speed detector 4. Then, the sinusoidal torque generator 8 reads the amplitude $K_N$ and the phase angle $\theta_N$ corresponding to the order N from the table that is included in the map M1 of the memory 81 and corresponds to the rotational speed $\omega$. Based on the amplitude $K_N$ and the phase angle $\theta_N$, the sinusoidal torque generator 8 generates a sinusoidal voltage signal VS for allowing the motor 60 to produce the sinusoidal torque $T_S$ represented by the equation (1). The sinusoidal voltage signal VS is output to the processing unit 6.

In the processing unit 6, the q-axis voltage signal VQ and the sinusoidal voltage signal VS are combined into a combined voltage signal VQ+VS. The combined voltage signal VQ+VS is output to the drive circuit 7.

Because the load torque changes in a period of T3 as shown in FIG. 8A, the rotational speed $\omega$ of the motor 60 changes accordingly. The q-axis voltage signal VQ generated by the processing unit 6 allows the motor 60 to be supplied with a driving voltage corresponding to the driving torque. As shown in FIG. 8B, the driving voltage changes such that the driving torque of the motor 60 follows the change in the load torque. Thus, the change in the rotational speed $\omega$ of the motor 60 can be reduced. The sinusoidal voltage signal VS allows the motor 60 to be supplied with a sinusoidal voltage that corresponds to the sinusoidal torque $T_S$ and changes in a period of T4. Therefore, the combined voltage signal VQ+VS allows the motor 60 to be supplied with a combined voltage shown in FIG. 8C.

Third Embodiment

A motor control apparatus 300 according to the second embodiment of the present invention will now be described with reference to FIG. 9.

In the motor control apparatus 300, a sinusoidal torque generator 8 generates a sinusoidal rotational speed signal $\omega S$ for allowing the motor 60 to produce the sinusoidal torque $T_S$ represented by the equation (1). The sinusoidal rotational speed signal $\omega S$ and a signal for indicating the desired rotational speed $\omega 0$ are combined into a combined speed signal $\omega 0+\omega S$. As shown in FIG. 9, a deviation signal between the combined speed signal $\omega 0+\omega S$ and a signal for indicating the rotational speed signal $\omega$ is input to a processing unit 6. The control operation signal 6 generates the q-axis current signal IQ based on the deviation signal and outputs the q-axis current signal IQ to a drive circuit 7. The drive circuit 7 generates the PWM signal based on the q-axis current signal IQ and outputs the PWM signal to the inverter circuit 2.

Fourth Embodiment

Figures 9, 10, 11:
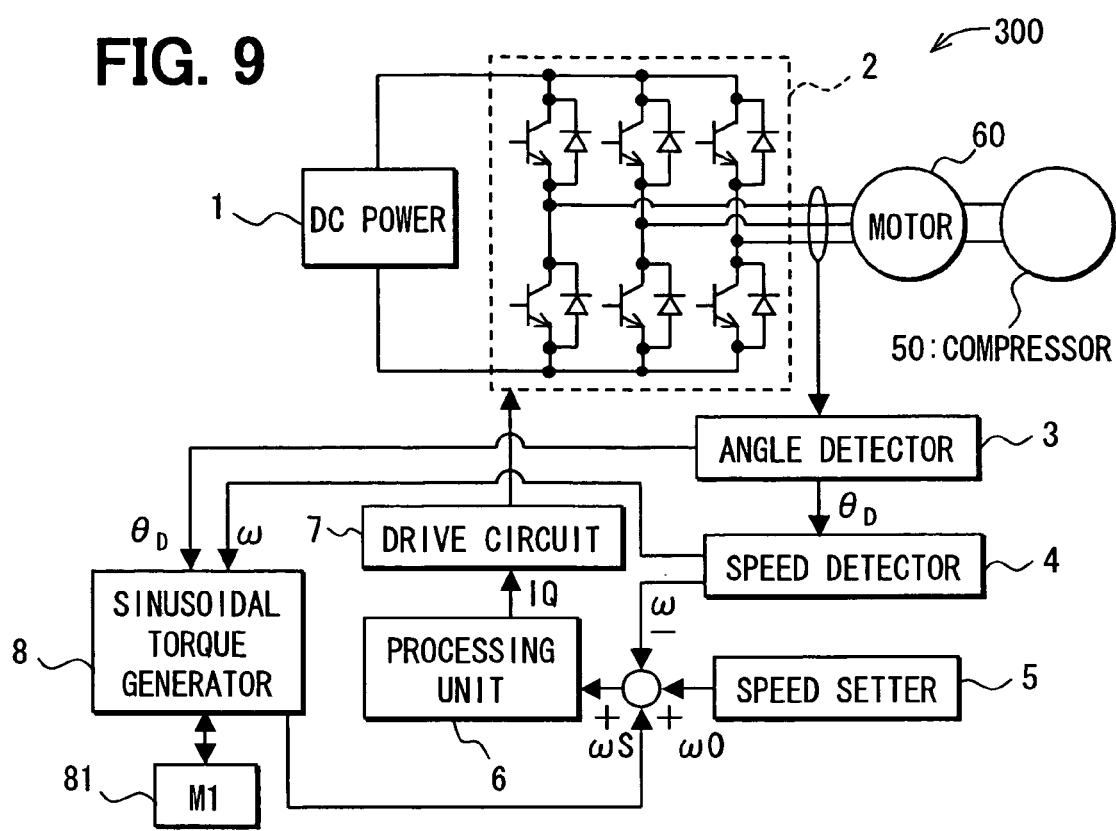
FIG. 9 is a block diagram of a motor control apparatus according to a third embodiment of the present invention.
FIG. 10 is a map included in a motor control apparatus according to a fourth embodiment of the present invention.
FIG. 11 is a map included in a motor control apparatus according to a fifth embodiment of the present invention.
Figure 12:
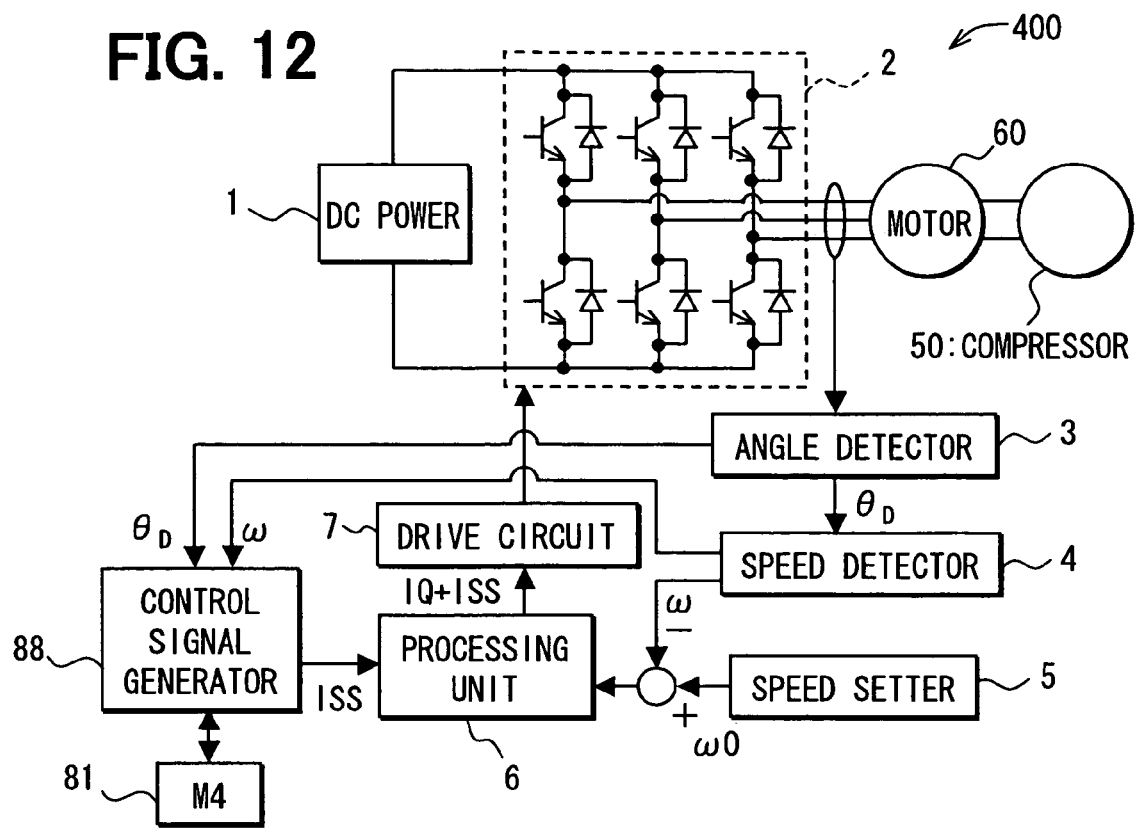
FIG. 12 is a block diagram of a motor control apparatus according to a sixth embodiment of the present invention.

In the fourth embodiment according to the present invention, the memory 81 includes a map M2 shown in FIG. 10 instead of the map M1 shown in FIG. 2. In each table of the map M2, a first column contains a frequency $F_N$ instead of the order N, a second column contains an amplitude $KF_N$ corresponding to frequency $F_N$, and a third column contains a phase angle $\theta F_N$ corresponding to the frequency $F_N$, where N is a positive integer. For example, in a table corresponding to the rotational speed $\omega$ of 4000 rpm, a frequency $F_1$ may be 800 Hz and a frequency $F_2$ may be 1200 Hz. Alternatively, the frequency $F_N$ that is set in each table of the map M2 may correspond to a resonant frequency of the engine block to which the compressor 50 is mounted, the motor 60, or the refrigerant that circulates through the refrigeration cycle.

The sinusoidal torque generator 8 reads the frequency $F_N$, the amplitude $KF_N$, and the phase angle $\theta F_N$ from the map M2. Then, the sinusoidal torque generator 8 generates the sinusoidal current signal IS for allowing the motor 60 to produce the sinusoidal torque $T_S$ having the frequency $F_N$ and the amplitude $KF_N$ and the phase angle $\theta F_N$. Alternatively, the sinusoidal torque generator 8 may generate the sinusoidal voltage signal VS and the sinusoidal voltage signal VS may be input to the processing unit 6. Alternatively, the sinusoidal torque generator 8 may generate the sinusoidal rotational speed signal $\omega S$ and the deviation signal between the combined speed signal $\omega 0+\omega S$ and the signal for indicating the rotational speed signal $\omega$ is input to the processing unit 6.

Fifth Embodiment

In the fifth embodiment according to the present invention, the memory 81 includes a map M3 shown in FIG. 11 instead of the map M1 shown in FIG. 2. The map M3 has a set of tables each of which also corresponds to discharge pressure $P_N$ of the compressor 50. For example, a pressure sensor (not shown) detects the discharge pressure $P_N$. Alternatively, the discharge pressure $P_N$ may be estimated from, for example, a current flowing through the motor 60 or the driving torque of the motor 60.

The sinusoidal torque generator 8 reads the amplitude $KP_N$ and the phase angle $\theta P_N$ corresponding to the discharge pressure $P_N$ from the map M3. Then, the sinusoidal torque generator 8 generates the sinusoidal current signal IS for allowing the motor 60 to produce the sinusoidal torque $T_S$ having the amplitude $KP_N$ and the phase angle $\theta P_N$. Alternatively, the sinusoidal torque generator 8 may generate the sinusoidal voltage signal VS and the sinusoidal voltage signal VS may be input to the processing unit 6. Alternatively, the sinusoidal torque generator 8 may generate the sinusoidal rotational speed signal $\omega S$ and the deviation signal between the combined speed signal $\omega 0+\omega S$ and the signal for indicating the rotational speed signal $\omega$ is input to the processing unit 6.

Even when the rotational speed $\omega$ of the motor 60 is constant, the discharge pressure $P_N$ may change. By using the map M3, the noise and vibration due to the change in the discharge pressure $P_N$ can efficiently reduced.

Sixth Embodiment

A motor control apparatus 400 according to the sixth embodiment of the present invention will now be described with reference to FIGS. 12-14 14B. The motor control apparatus 400 includes a control signal generator 88 instead of the sinusoidal torque generator 8.

Figure 13:
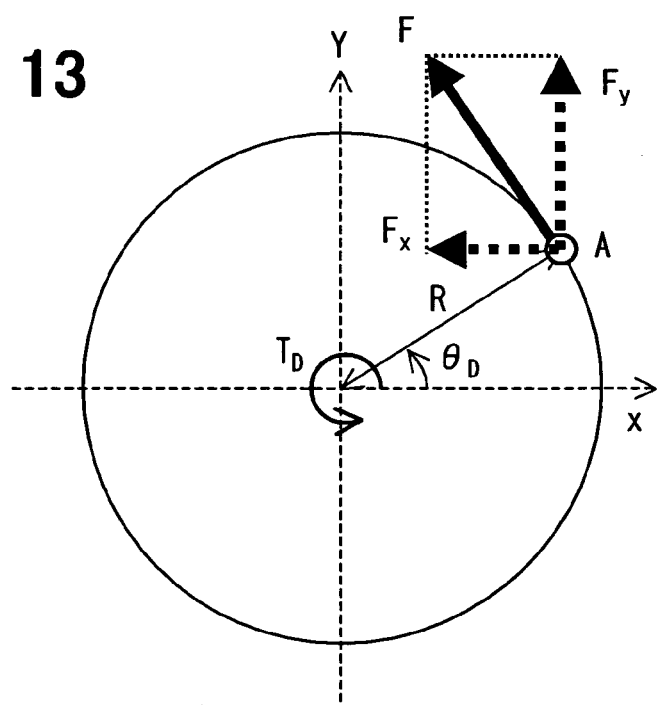
FIG. 13 is a view showing force acting on a compressor of FIG. 12.

When the compressor 50 is a scroll compressor, a force F acting on a compression section (i.e., orbiting scroll) of the compressor 50 at a point A can be represented as shown in FIG. 13. In FIG. 13, $T_D$ represents a driving torque of the motor 60 and R represents an eccentric radius, i.e., a distance between the point A and a center of the drive shaft of the motor 60. In this case, the driving torque $T_D$ is given by:

$$T_D = F \cdot R \quad (2)$$

As shown in FIG. 13, the force F is decomposed into an X-component force Fx and a Y-component force Fy. The X-component force Fx and the Y-component force Fx are forces acting in X direction and Y direction of FIG. 14, respectively. In the motor 60 or the mounting structure (i.e., engine block) including the motor 60, the noise and vibration tend to occur in the X direction and the Y direction. Specifically, at least one frequency component of the X-component force Fx and the Y-component force Fy produces the noise and vibration having a frequency corresponding to the frequency component.

The control signal generator 88 generates a current control signal ISS for allowing the motor 60 to produce a control torque $T_C$ for producing a sinusoidal force. The sinusoidal force has opposite phase to the frequency component of the X-component force Fx and the Y-component force Fy. Thus, the noise and vibration produced by the frequency component can be reduced.

Figures 14A, 14B, 15:
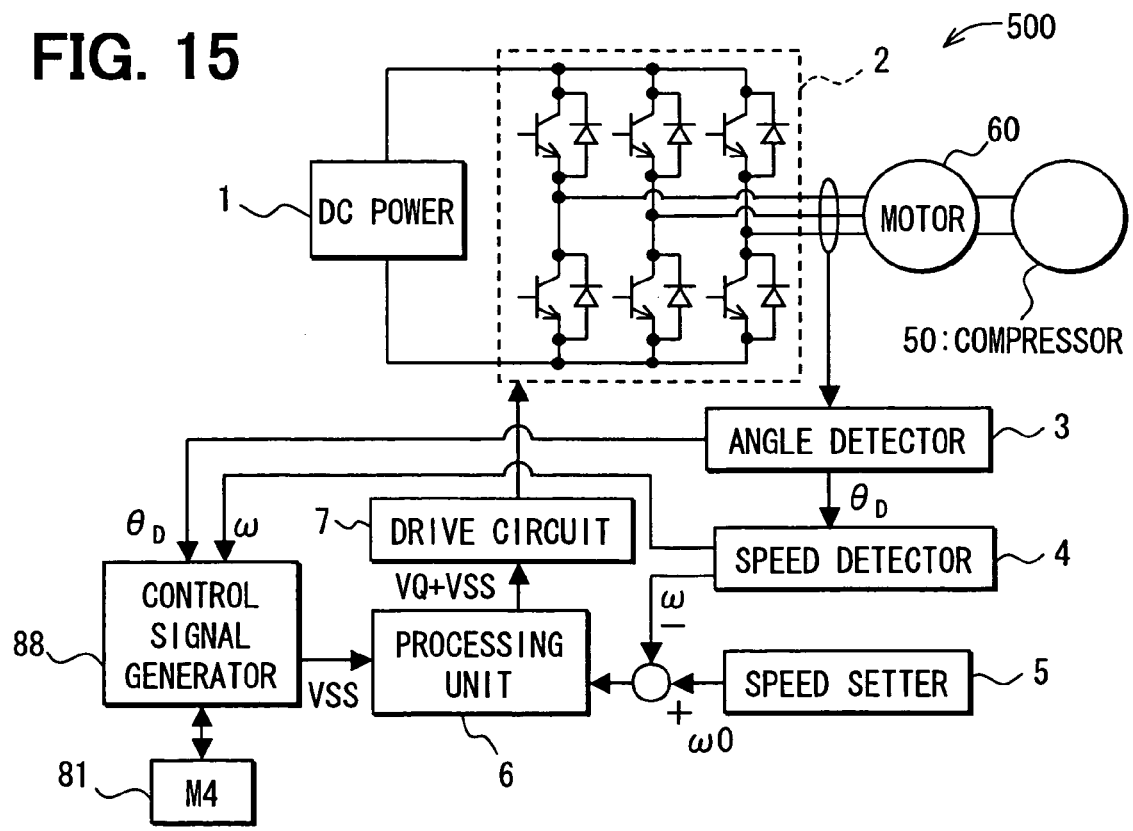
FIG. 14A is a X-direction map included in the motor control apparatus of FIG. 12.
FIG. 14B is a Y-direction map included in the motor control apparatus of FIG. 12.
FIG. 15 is a block diagram of a motor control apparatus according to a seventh embodiment of the present invention.

The control signal generator 88 has a memory 81 that stores a map M4 including a map MX shown in FIG. 14A and a map MY shown in FIG. 14B. The map MX is used for the noise and vibration reduction in the X-direction and the map MY is used for the noise and vibration reduction in the Y-direction. Each of the map MX and the map MY has a set of tables each of which corresponds to each rotational speed $\omega$ of the motor 60. Each table of the map MX and the map MY has three columns and at least one row.

In each table of the map MX, a first column contains an order N, a second column contains an amplitude $KX_N$ corresponding to the order N, and a third column contains a phase angle $\theta X_N$ corresponding to the order N, where N is a positive integer. Likewise, in each table of the map MY, a first column contains an order M, a second column contains an amplitude $KY_M$ corresponding to the order M, and a third column contains a phase angle $\theta Y_M$ corresponding to the order M, where M is a positive integer.

When the current control signal ISS generated by the control signal generator 88 has the amplitudes $KX_N$, $KY_N$ and the phase angles $\theta X_N$, $\theta Y_N$, the noise and vibration of the motor 60 is reduced. The amplitudes $KX_N$, $KY_N$ and the phase angles $\theta X_N$, $\theta Y_N$ are determined in the experiment where the motor 60 is mounted on the vehicle and operated in practical conditions.

For example, when the motor 60 rotates at the rotational speed $\omega$ of $\omega 1$ and the sound pressure level in the X-direction exceeds a predetermined threshold level at the first order, an amplitude $KX_1$, and a phase angle $\theta X_1$ corresponding to the first order are set in the table that is included in the map MX and corresponds to the rotational speed $\omega$ of $\omega 1$, as shown in FIG. 14A. In this case, if the sound pressure level in the Y-direction exceeds the predetermined threshold level at the first and third orders, amplitude $KY_1$, $KY_3$ and phase angles $\theta Y_1$, $\theta Y_3$ corresponding to the first and third orders, respectively, are set in the table that is included in the map MY and corresponds to the rotational speed $\omega$ of $\omega 1$.

In such an approach, the sound pressure levels in each direction of the X-direction and the Y direction are reduced so that the noise and vibration of the motor 60 can be efficiently reduced. Alternatively, the orders N, M may correspond to a resonant frequency of the motor 60 joined to the compressor 50, the mounting structure including the motor 60 joined to the compressor 50, or the refrigerant that circulates through the refrigeration cycle. By using the map M4, the current control signal ISS can be easily calculated in a short time.

The control signal generator 88 receives the rotational speed $\omega$ of the motor 60 from the rotational speed detector 4. Then, the control signal generator 88 reads the amplitude $KX_N$ and the phase angle $\theta X_N$ corresponding to the order N from the table that is included in the map MX of the memory 81 and corresponds to the rotational speed ω. Based on the amplitude $KX_N$ and the phase angle $\theta X_N$, the control signal generator 88 generates a X-component signal $ISS_X$ of the current control signal ISS. The X-component signal $ISS_X$ is represented by the following equation;

$$ISS_X = \frac{-KX_N \cdot \sin(N \cdot \theta_D + \theta X_N)}{\sin\theta_D} \quad (3)$$

Likewise, the control signal generator 88 also reads the amplitude $KY_M$ and the phase angle $\theta Y_M$ corresponding to the order M from the table that is included in the map MY of the memory 81 and corresponds to the rotational speed ω. Based on the, amplitude $KY_M$ and the phase angle $\theta Y_M$, the control signal generator 88 generates a Y-component signal $ISS_Y$ of the current control signal ISS. The Y-component signal $ISS_Y$ is represented by the following equation;

$$ISS_Y = \frac{KY_M \cdot \sin(M \cdot \theta_D + \theta Y_M)}{\cos\theta_D} \quad (4)$$

The X-component signal $ISS_X$ and the Y-component signal $ISS_Y$ are combined into the current control signal ISS.

Operations of the motor control apparatus 400 will now be described. The motor control apparatus 400 starts the motor 60 and controls the motor 60 such that the motor 60 rotates at the desired rotational speed ω0. Specifically, the processing unit 6 generates the q-axis current signal IQ and receives the current control signal ISS from the control signal generator 88. In the processing unit 6, the q-axis current signal IQ and the current control signal ISS are combined into a combined signal IQ+ISS. The processing unit 6 outputs the combined signal IQ+ISS to the drive circuit 7. The drive circuit 7 generates the PWM signal based on the combined signal IQ+ISS and outputs the PWM signal to the inverter circuit 2. Thus, the motor 60 produces the control torque $T_C$ for producing the sinusoidal force. The sinusoidal force has the opposite phase to the frequency component of the X-component force Fx and the Y-component force Fy. Thus, the noise and vibration produced by the frequency component can be reduced.

In this case, when the amplitude of the current control signal ISS is larger than that of the q-axis current signal IQ, the motor 60 cannot rotate. Therefore, the amplitude of the current control signal ISS is set such that the amplitude of the current control signal ISS is smaller than that of the q-axis current signal IQ.

Seventh Embodiment

A motor control apparatus 500 according to the sixth embodiment of the present invention will now be described with reference to FIG. 15.

In the motor control apparatus 500, a control signal generator 88 generates the q-axis voltage signal VQ. A control signal generator 88 receives the rotational speed ω of the motor 60 from the rotational speed detector 4. Then, the control signal generator 88 reads the amplitude $KX_N$ and the phase angle $\theta X_N$ corresponding to the order N from the table that is included in the map MX of the memory 81 and corresponds to the rotational speed ω. Further, the control signal generator 88 also reads the amplitude $KY_M$ and the phase angle $\theta Y_M$ corresponding to the order M from the table that is included in the map MY of the memory 81 and corresponds to the rotational speed ω. Based on the amplitudes $KX_N$, $KY_M$ and the phase angles $\theta X_N, \theta Y_M$, the control signal generator 88 generates a voltage control signal VSS for allowing the motor 60 to produce the control torque $T_C$. The voltage control signal VSS is output to the processing unit 6.

In the processing unit 6, the q-axis voltage signal VQ and the voltage control signal VSS are combined into a combined voltage signal VQ+VSS. The combined voltage signal VQ+VSS is output to the drive circuit 7. The drive circuit 7 generates the PWM signal based on the combined voltage signal VQ+VSS and outputs the PWM signal to the inverter circuit 2. Thus, the motor 60 produces the control torque $T_C$ for producing the sinusoidal force. The sinusoidal force has the opposite phase to the frequency component of the X-component force Fx and the Y-component force Fy. Thus, the noise and vibration produced by the frequency component can be reduced.

Eighth Embodiment

Figure 16:
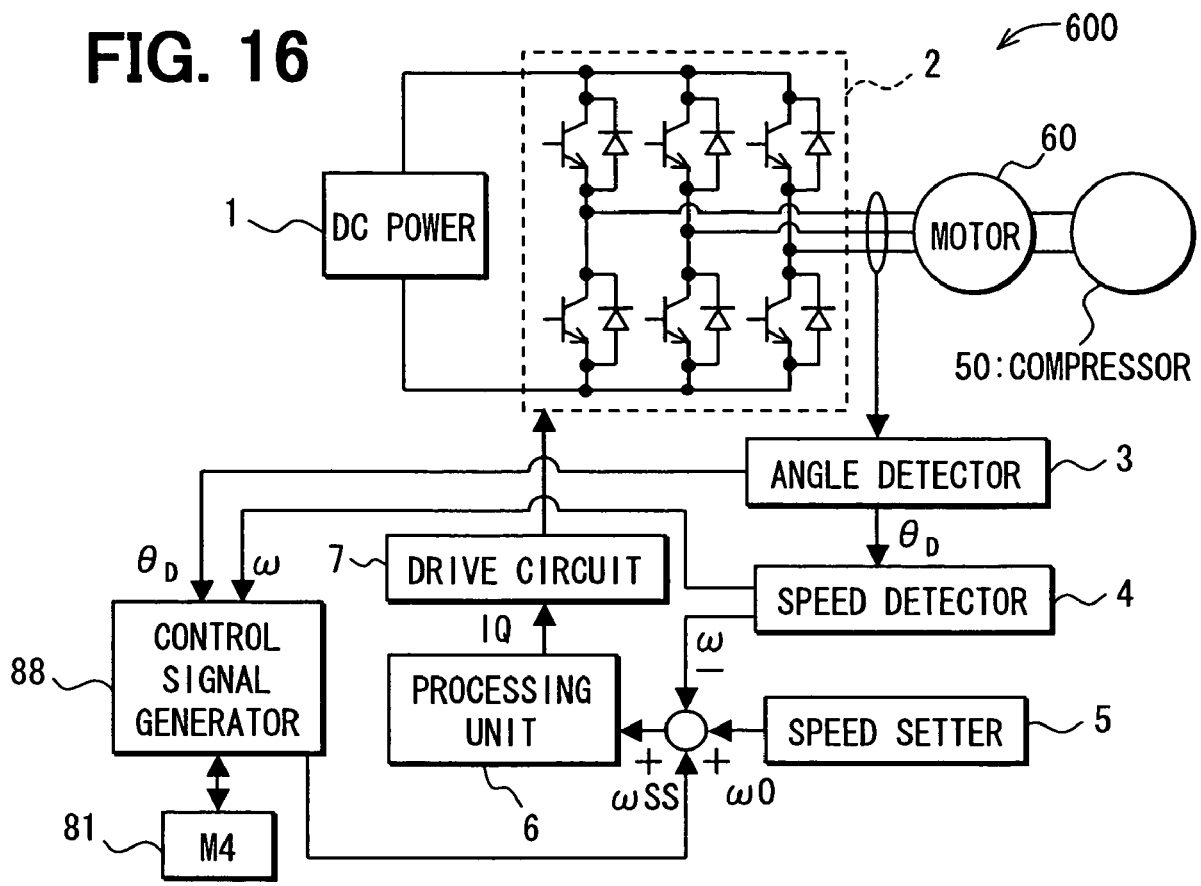
FIG. 16 is a block diagram of a motor control apparatus according to an eighth embodiment of the present invention.

A motor control apparatus 600 according to the eighth embodiment of the present invention will now be described with reference to FIG. 16.

In the motor control apparatus 600, a control signal generator 88 generates a rotational speed control signal ωSS for allowing the motor 60 to produce the control torque $T_C$. The rotational speed control signal ωSS and the signal for indicating the desired rotational speed ω0 are combined into a combined speed signal ω0+ωSS. As shown in FIG. 16, a deviation signal between the combined speed signal ω0+ωSS and the signal for indicating the rotational speed signal ω of the motor 60 is input to a processing unit 6. The processing unit 6 generates a q-axis current signal IQ based on the deviation signal and outputs the q-axis current signal IQ to the drive circuit 7. The drive circuit 7 generates the PWM signal based on the q-axis current signal IQ and outputs the PWM signal to the inverter circuit 2. Thus, the motor 60 produces the control torque $T_C$ for producing the sinusoidal force. The sinusoidal force has the opposite phase to the frequency component of the X-component force Fx and the Y-component force Fy. Thus, the noise and vibration produced by the frequency component can be reduced.

Modifications

The embodiments described above may be modified in various ways. For example, the order may be replaced with the frequency corresponding to the order.

Instead of using the Maps 2-4, each of the amplitude and the phase angle may be set as the function of the rotational angle $\theta_D$, or the rotational speed ω of the motor 60, as shown in FIGS. 4A and 4B. In such an approach, the required storage capacity for the memory 81 can be reduced.

The amplitude and phase angle corresponding to the order may be set based on a physical quantity that is obtained from the compressor 50 when the motor 60 drives the compressor 50. For example, the amplitude and phase angle corresponding to the order may be set based on temperature or pressure of the refrigerant circulating through the refrigeration cycle. In such an approach, the noise and vibration due to the change in the physical quantity can be reduced.

The motor 60 may drives various types of fluid machinery such as a fluid pump for pumping a coolant in a rankine cycle. The motor 60 may be a vehicular motor to drive the vehicle. The compressor 50 may be a component of a home air conditioner unit.

The control torque $T_C$ may produce force acting in a direction in which resonance amplitude of a resonant mode of the motor 60 or the mounting structure including the motor 60 exceeds a predetermined threshold level.

Each of the signals IS, ISS, VS, VSS, ωS, and ωSS may decrease in amplitude with time. Each of the signals IS, ISS, VS, VSS, ωS, and ωSS may be a square signal into which multiple sinusoidal signals are combined.

Such changes and modifications are to be understood as being within the scope of the present invention as defined by the appended claims.

What is claimed is:

1. A motor control apparatus that supplies a drive signal to a motor for driving a compressor that is joined to the motor and compresses a refrigerant used in a vehicle refrigeration cycle, the motor control apparatus for controlling the motor to reduce noise or vibration due to operation of the motor and comprising:
    a detecting means for detecting a rotational speed of the motor;
    a command signal processing means that generates a command signal for allowing the motor to rotate at a predetermined rotational speed;
    a drive means that generates the drive signal based on the command signal and supplies the drive signal to the motor, and
    a control signal generation means that generates a control signal for allowing the motor to produce a control torque having a frequency equal to one of frequencies of the noise and vibration, the frequency of the control torque having a plurality of frequency components including at least a resonance frequency of the motor, a resonance frequency of a motor mounting structure to which the motor is fixed, and a resonance frequency of the refrigerant, the control signal generation means outputting the control signal to the command signal processing means, wherein
    the control signal has an amplitude smaller than the amplitude of the command signal and includes a plurality of sinusoidal components each corresponding to a different one of the plurality frequency components of the control torque,
    the command signal processing means generates the command signal based on the control signal and outputs the command signal to the drive means, and
    the control signal generation means sets an amplitude and a phase angle of the control signal and the frequency based on the rotational speed of the motor, a rotational angle of the motor, or a physical quantity that is obtained from the load when the motor drives the load, and generates the control signal based on the amplitude, the phase angle, and the frequency.

2. The motor control apparatus according to claim 1, wherein
    the frequency of the control torque corresponds to an order of the rotational speed detected by the detecting means.

3. The motor control apparatus according to claim 1, wherein the control torque produces a force acting on the load in a predetermined direction.

4. The motor control apparatus according to claim 3, wherein
    a sound pressure level of the noise or the vibration exceeds a predetermined pressure level at a predetermined position in the predetermined direction.

5. The motor control apparatus according to claim 3, wherein
    the motor has a first resonant mode in which resonance occurs in the predetermined direction, and
    an amplitude of the resonance exceeds a predetermined amplitude level.

6. The motor control apparatus according to claim 3, wherein
    a mounting structure including to motor has a second resonant mode in which resonance occurs in the predetermined direction, and
    an amplitude of the resonance exceeds a predetermined amplitude level.

7. The motor control apparatus according to claim 3, wherein
    an amplitude of the vibration due to the operation of the motor exceeds a predetermined amplitude level iii the predetermined direction.

8. The motor control apparatus according to claim 1, wherein
    the control signal allows the motor to produce the control torque that reduces the noise or vibration as much as possible.

9. The motor control apparatus according to claim 1, wherein
    the control signal generation means includes a map having a plurality of tables,
    each table corresponds to each rotational speed of the motor, each rotational angle of the motor, or each physical quantity, and includes the amplitude, the phase angle, and the frequency, and
    the control signal generation means reads the amplitude, the phase angle, and the frequency from the map to generate the control signal.

10. The motor control apparatus according to claim 1, wherein
    the amplitude is set as a first function of the rotational speed of the motor, the rotational angle of the motor, or the physical quantity.

11. The motor control apparatus according to claim 1, wherein
    the phase angle is set as a second function of the rotational speed of the motor, the rotational angle of the motor, or the physical quantity.

12. The motor control apparatus according to claim 1, wherein
    the frequency is a frequency of the noise having a sound pressure level tat is larger than a predetermined sound pressure level at a predetermined position.

13. The motor control apparatus according to claim 1, wherein
    the control signal contains information related to a current for driving the motor.

14. The motor control apparatus according to claim 1, wherein
    the control signal contains information related to a voltage driving the motor.

15. The motor control apparatus according to claim 1, wherein
    the control signal contains information related to the rotational speed of the motor.

16. The motor control apparatus according to claim 1, wherein
    the control signal decreases in amplitude with time.

17. The motor control apparatus according to claim 1, further comprising:
    a pressure detecting means for detecting pressure, wherein the load is a compressor used in a refrigeration cycle,
    the pressure detecting means detects discharge pressure of the compressor, and
    the physical quantity is the detected pressure.

* * * * *